US008939622B2

(12) United States Patent
Buisson

(10) Patent No.: US 8,939,622 B2
(45) Date of Patent: Jan. 27, 2015

(54) SIGNAL LIGHT DEVICE FOR A MOTOR VEHICLE

(75) Inventor: Alain Buisson, Trappes (FR)

(73) Assignee: Automotive Lighting Rear Lamps France S.A.S., Saint-Julien du Sault (FR)

( * ) Notice: Subject to any disclaimer, the term of this patent is extended or adjusted under 35 U.S.C. 154(b) by 284 days.

(21) Appl. No.: 13/515,124

(22) PCT Filed: Dec. 10, 2010

(86) PCT No.: PCT/EP2010/069395
§ 371 (c)(1),
(2), (4) Date: Sep. 13, 2012

(87) PCT Pub. No.: WO2011/070161
PCT Pub. Date: Jun. 16, 2011

(65) Prior Publication Data

US 2013/0003397 A1 Jan. 3, 2013

(30) Foreign Application Priority Data

Dec. 11, 2009 (FR) ...................................... 09 05984

(51) Int. Cl.
*B60Q 1/26* (2006.01)
*F21S 8/10* (2006.01)
(Continued)

(52) U.S. Cl.
CPC ........... *F21S 48/215* (2013.01); *F21S 48/2243* (2013.01); *F21S 48/2268* (2013.01);
(Continued)

(58) Field of Classification Search
USPC ......... 362/511, 555, 551, 800, 600, 602, 603, 362/610, 612, 616, 23.09, 23.1, 23.16, 362/23.17
See application file for complete search history.

(56) References Cited

U.S. PATENT DOCUMENTS 5,984,497 A * 11/1999 Foerstner et al. ............. 362/511
5,997,155 A 12/1999 Ducharme et al.
(Continued)

FOREIGN PATENT DOCUMENTS

| | | | |
|---|---|---|---|
| DE | 101 01 795 | A1 | 7/2002 |
| DE | 102 07 694 | A1 | 11/2003 |
| DE | 103 11 317 | A1 | 9/2004 |
| EP | 1 434 000 | A2 | 6/2004 |
| EP | 2 098 774 | A1 | 9/2009 |
| FR | 2 819 040 | A1 | 1/2001 |
| FR | 2 868 506 | A1 | 3/2004 |
| FR | 2 898 660 | A1 | 3/2006 |
| WO | 2011070161 | A1 | 6/2011 |

OTHER PUBLICATIONS

International Search Report for PCT/EP2010/069395.
International Written Opinion for PCT/EP2010/069395.

*Primary Examiner* — Bao Q Truong
(74) *Attorney, Agent, or Firm* — Howard & Howard Attorneys PLLC

(57) ABSTRACT

A device is for a lighting/signaling assembly of an automotive vehicle. The assembly includes a substantially transparent optical material and at least one light source of an "LED" type arranged for emitting light rays propagating within a thickness of the optical material. The device comprises a plate of substantially transparent optical material forming a screen and including at least one substantially bilateral elongated bulge defining a substantially circular overall substantially perpendicular cross-section and substantially mean longitudinal axis in a substantially mid-plane of the bulge and being adapted to form a light guide. At least one LED is disposed at at least one end of the light guide and defines a main axis of the LED that is substantially orthogonal to a substantially longitudinal axis of the light guide.

16 Claims, 3 Drawing Sheets

Cross-section A-A

(51) Int. Cl.
*F21V 8/00* (2006.01)
*F21W 101/14* (2006.01)
*F21Y 101/02* (2006.01)

(52) U.S. Cl.
CPC ....... *F21S48/2281* (2013.01); *F21V 2008/002* (2013.01); *F21W 2101/14* (2013.01); *F21Y 2101/02* (2013.01)
USPC ............................ 362/511; 362/612; 362/555

(56) References Cited

U.S. PATENT DOCUMENTS

2005/0111235 A1 * 5/2005 Suzuki et al. ................. 362/555
2008/0089080 A1 * 4/2008 Kawaji et al. ................. 362/494
2009/0135621 A1 * 5/2009 Muegge ........................ 362/516

* cited by examiner

SIGNAL LIGHT DEVICE FOR A MOTOR VEHICLE

CROSS-REFERENCE TO RELATED APPLICATIONS

This application is a "national phase" application based upon International Patent Application PCT/EP2010/069395 filed on Dec. 10, 2010 and entitled "Signal Light Device for a Motor Vehicle," which, in turn, claims priority to and benefit of the filing date of French Patent Application 09/05984 filed on Dec. 11, 2009 and entitled "Signal Light Device for a Motor Vehicle."

BACKGROUND OF INVENTION

1. Field of Invention

The invention relates, generally, to the field of lighting and signaling for a vehicle (notably, an automobile vehicle) and more particularly, to a device for signaling lights of the vehicle and comprising a screen made of transparent material into which a light emitted by at least one LED is scattered combined with at least one favored region of the transparent material.

2. Description of Related Art

Regulations in force impose, depending on the types of vehicles, various illuminating or signaling lights. The trend is then to group these lights as far as possible into assemblies volume of which is an important parameter. Furthermore, the performance and uniformity of illumination of the individual lights thus grouped are major issues.

In the prior art, auxiliary transparent screens are already known in which the light emitted by an auxiliary light source can propagate. These screens are designed to be fitted to a light (notably, a rear light) of an automobile vehicle. Local discontinuities provided in the material of the screen form scattering centers for the light out of these screens (see French Patent Publication 2 868 506).

In German Patent Application DE 101 01 795, indicator lights (notably, front indicator lights) are described for automobile vehicles in which an auxiliary light source for a position light illuminates an element disposed in a transverse manner in the space between the main light and front lens and produces through the latter an illumination in the same direction as that of the main light.

In French Patent Application 01 00048 (published under 2 819 040), an optical or stylistic component is described for the lighting or signaling in automobile vehicles. This component is made of a transparent material within which scattering centers for light are situated only at predetermined places for scattering the light emitted by a source associated with the lighting or signaling device in question. This component can form the lens of an automobile-vehicle headlamp or an insert placed within such a headlamp.

In German Patent Application DE 103 11 317, a lighting device is described for a vehicle comprising a light guide including scattering structures essentially situated at the focal points of reflecting surfaces that, therefore, allow a uniform illumination to be scattered.

Thus, there is a need in the related art for an original device or element for the lighting and/or signaling (notably, a side light) in automobile vehicles. More specifically, there is a need in the related art for such a device that alms to overcome the various respective drawbacks of the systems of signaling lights of the prior art. There is a need in the related art for such a device that also has a faster switch-on, reduced size, and lower contribution to "$CO_2$" emissions than the conventional signaling devices. There is a need in the related art for such a device that also allows stylistic effects to be added to the signaling lights on vehicles.

SUMMARY OF INVENTION

The invention overcomes the disadvantages in the related art in a device for a lighting/signaling assembly of an automotive vehicle. The assembly includes a substantially transparent optical material and at least one light source of an "LED" type arranged for emitting light rays propagating within a thickness of the optical material. The device comprises a plate of substantially transparent optical material forming a screen and including at least one substantially bilateral elongated bulge defining a substantially circular overall substantially perpendicular cross-section and substantially mean longitudinal axis in a substantially mid-plane of the bulge and being adapted to form a light guide. At least one LED is disposed at at least one end of the light guide and defines a main axis of the LED that is substantially orthogonal to a substantially longitudinal axis of the light guide. The invention overcomes the disadvantages in the related art also in the lighting/signaling assembly that comprises the device, which is integrated into a headlamp.

The invention is, therefore, a device for an illuminating and/or signaling light of an automobile vehicle.

The device according to the invention is mainly designed to function as a position lamp or light both at the rear and at the front of vehicles.

Aside from this or these bilateral elongated bulge(s) of substantially circular overall perpendicular cross-section, the element composed of the optically transparent material in practice forms a plate (plane or concave), and the the bulging part forms an integral part of the plate.

In the description that follows, "element" refers to a plate with at least one bulge or bead forming a light, guide, and "device" refers to the assembly element plus light-emitting diodes together with their connections to a source of power and any possible accessories. "Cylindrical regions" or "substantially cylindrical regions" refers to the bulges.

In one embodiment, the element made from transparent optical material is, thus, a plate (plane or curved) (and, in this case, the angle of curvature can be variable from one end of the plate to the other), and the bulging region or regions run through the latter from side to side along a longitudinal axis that is substantially parallel to the mid-plane of the plate. In the case of a plurality of such substantially cylindrical regions, these are practically parallel to one another. The light guides formed by these bulges can be linear, curved in two dimensions, or even curved one or more times in all three dimensions.

According to one embodiment of the invention, the device comprises an element having at least one substantially cylindrical region a transverse cross-section of which has a diameter substantially larger than the average thickness of the plate over the adjacent region or regions. An optimised scattering of the light is, thus, obtained substantially uniformly by total reflection within all or substantially all of the element. The latter can be made of glass or a plastic material [notably, methyl polymethacrylate (PMMA) or polycarbonate (PC)]. It can comprise conventional inclusions or irregularities disposed by design inside the element whereas the light guide comprises prisms with a predefined structure and angle to comply with the requirements of the relevant regulations known to those skilled in the related art.

Such an element can be obtained by injection, according to a conventional technique, with a thickness that is standard for this type of product of around 3 to 4 mm for the plate and a diameter of around 7 to 10 mm for the cylindrical bulges serving as light guides. For practical reasons associated with the constraints of the molding/demolding without undercut, the "join" line of the bulge section with the plate comprises a groove (for example, with a width of around 1.5 mm and a thickness of around 2.2 mm, where these should not be taken as limiting values).

Based on the prior art and their own knowledge, those skilled in the related art are able to select a positioning for the LED or LEDs on or close to the cylindrical regions of transparent optical material. In practice, the LBDs are placed on or close to a peripheral edge of the element directly above a substantially cylindrical region.

As a variant, the device can also comprise additional LEDs including one or more LEDs directed onto one of the tree edges of the plate or at least one plate section defined by the light guides. Such additional LEDs allow, if desired, additional lighting effects to be obtained.

Without being tied to any particular theoretical interpretation, it is thought that the cylindrical regions act in the material of the element according to the invention as favored light guides, which scatter practically the totality of the light emitted by the source in question over the entire length of the cylindrical bulge and, from there, substantially over the whole surface of the element adjacent to or surrounding the substantially cylindrical regions.

The element according to the invention can optionally comprise conventional inclusions and/or cavities providing scattering centers for the light and allowing the latter to be scattered either directly toward the outside or indirectly by reflection on a reflecting surface of an element disposed on the inside of the device within an optical assembly for a vehicle.

Thus, as is shown schematically in the figures to which reference should he made for non-limiting examples, the light guide of the element according to the invention is optionally equipped with conventional inclusions arranged to allow the light rays originating from the light source to be deviated into the wings or plate sections (plane or curved), which extend in the vicinity of the light guide in question or into the parts of the element situated between two such light guides.

Decorative dots may be optionally included within the plate. They are disposed is staggered formation for reasons of uniformity.

Decorative lines of any given shape (for example, representing a logo or acronym) may also be provided on the plate.

In practice, by thus replacing or completing the dots included In the plate by continuous or dotted lines or other types of lines, decorative patterns of various types can be formed that the illumination of the device according to the invention reveals with a particularly noticeable relief effect.

The conventional cones introduced into the guides by known means are always normal to the surface and with no undercut.

As an option, the light guides may also comprise reflector elements and/or decorative elements that, by projection onto the neighboring portions of the device according to the invention, draw a suitable shape virtually on the plane or curved surfaces of the latter.

Prisms or other elements with local discontinuities (such as those described in French Patent Publication 2 868 506) may be advantageously included on the plate in such a manner as to allow the latter to fulfill the function specified by the regulations for an automobile vehicle light in the case of a front light, the device is equipped with a source of white light.

In one embodiment, the outside perimeter of the device according to the invention comprises a shoulder that highlights the contour of the light.

At the end of the light guide opposite to that fitted with at least one LED, a shield for masking from view the light escaping from the plate around its perimeter, a reflecting element made of metal, or bevels and/or prisms can be provided.

A lighting or signaling assembly for automobile vehicles comprises at least one device according to the invention integrated into a headlamp that ail the other necessary functional elements.

The lighting or signaling assembly thus formed can fulfill the conventional functions as direction indicators, stop lights, reversing lights, or fog lamps.

As a variant, the lens of the headlamp can he formed by the element according to the invention itself.

Other objects, features, and advantages of the invention are readily appreciated as the same becomes better understood, while the subsequent detailed description of embodiments of the invention is read taken in conjunction with the accompanying drawing thereof.

BRIEF DESCRIPTION OF EACH FIGURE OF DRAWING OF INVENTION

DETAILED DESCRIPTION OF EMBODIMENTS OF INVENTION

Figure 1A:
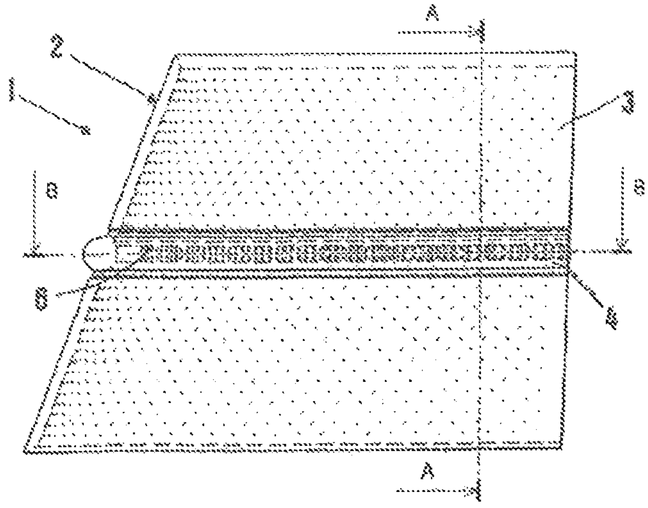
FIG. 1 shows an embodiment of an element according to the indention as a partial front view (FIG. 1A), partial schematic cross-sectional view along "A-A" (FIG. 1B), and partial schematic cross-sectional view along "B-B" (FIG. 1C).

With reference to the drawing (which illustrates, but does not in any way limit), the device 1 according to the invention comprises art element 2 formed from an optically transparent plate 3 having at least one substantially cylindrical region 4 and includes at at least one of the ends of the region 4 an LED 5 suitably powered and directed for emitting in the longitudinal direction of the cylindrical region 4.

On the outside wall of the cylinder 4 and/or on at least one of the faces of the plate 3 or of chosen portions of the latter, local discontinuities 6 are provided that represent scattering centers for the light produced by the LEDs 5 in operation. These discontinuities can be formed by conventional means known to those skilled in the related art. They are disposed at predetermined locations chosen by design. A uniform and bright illumination is thus obtained, providing the desired result in a lighting or signaling device for automobile vehicles.

The discontinuities 6 can be designed, and arranged, for example, as described in French Patent Publication 2 898 660.

Figure 1B:
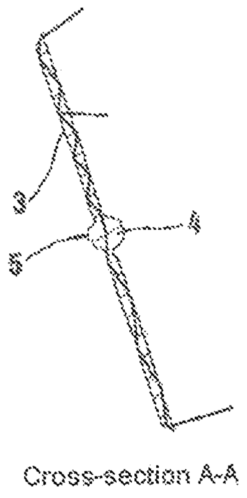
Figure 1C:
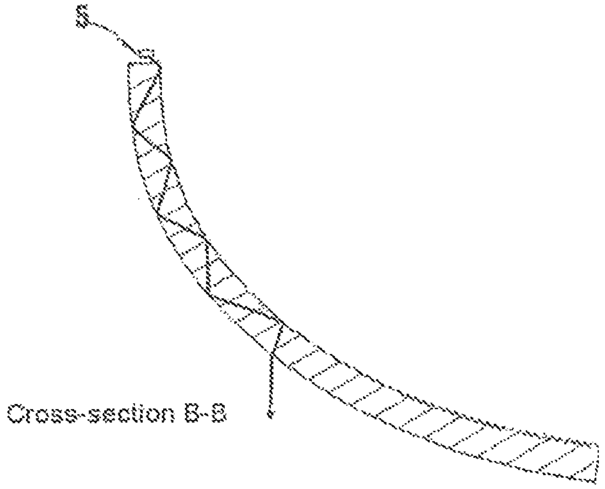
Figure 2A:
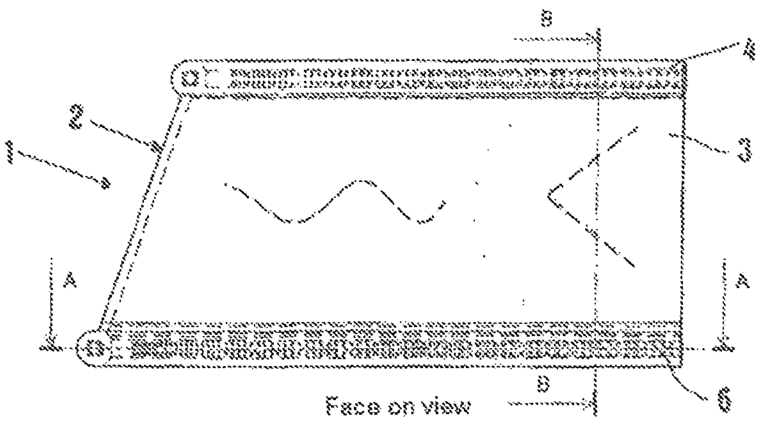
FIG. 2 shows another embodiment of an element according to the invention as a partial front view (FIG. 2A), partial schematic cross-sectional view along "A-A" (FIG. 2B), and partial schematic cross-sectional view along "B-B" (FIG. 2C).
Figure 2B:
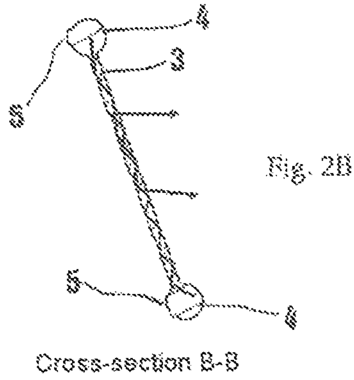
Figure 2C:
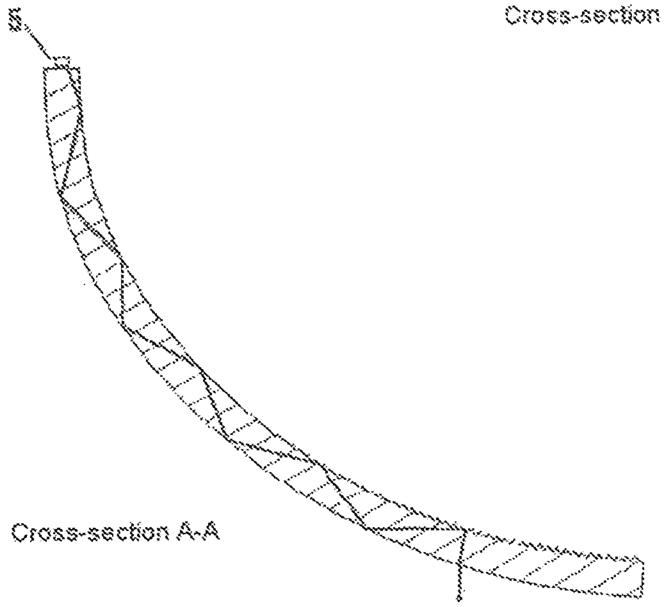
Figure 3A:
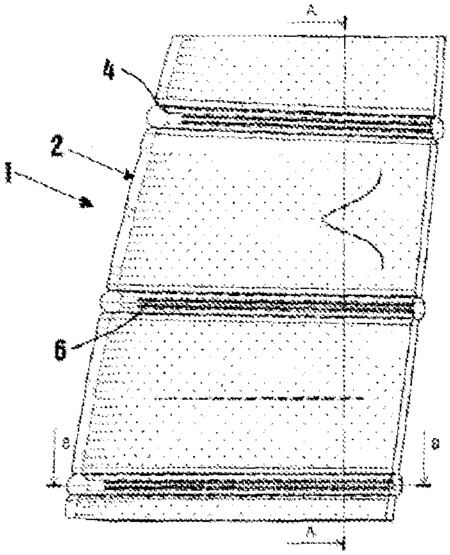
FIG. 3 shows another embodiment of an element according to the invention as a partial front view (FIG. 3A), view from the left (FIG. 3B), partial schematic cross-sectional view along "A-A" in a signaling-light assembly (FIG. 3C), and partial schematic cross-sectional view along "B-B" (FIG. 3D).
Figure 3B:
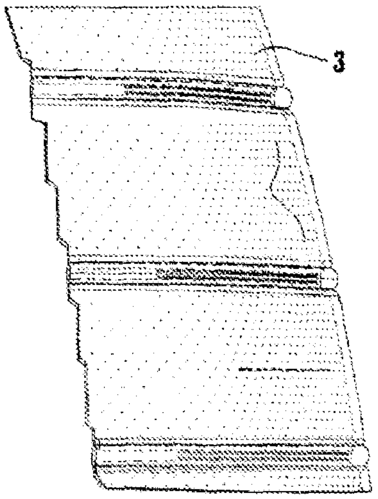
Figure 3C:
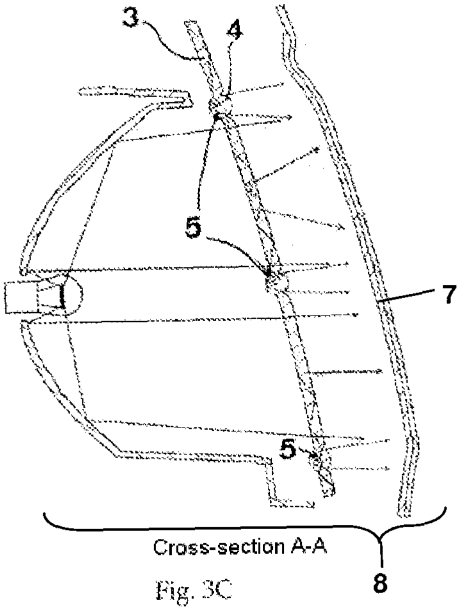
Figure 3D:
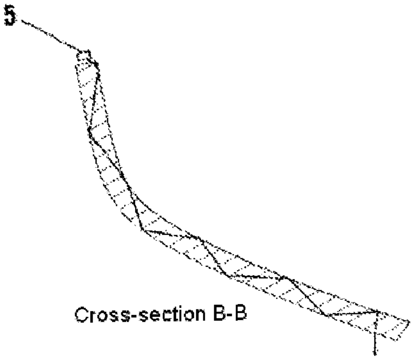

FIG. 1 show schematically such an element 2 comprising a median cylindrical region. FIG. 2 shows schematically an element 2 comprising two lateral cylindrical regions. FIG. 3 shows schematically an element 2 comprising three parallel cylindrical regions.

In FIGS. 1B, 1C, 2B, 2C, 3C, and 3D, respective examples of paths followed by light rays originating from the LEDs 5 are shown.

A lens 7 can close the fixture, but it can be replaced completely or in part by the device according to the invention, suitably fixed as the front face of the signaling optical assembly 8.

In one embodiment there is a vertical or horizontal disposition of the cylindrical elements.

With regard to the scattering elements on the plate of optically transparent material, these can have any given disposition.

In all the embodiments, the light rays coining from the LEDs 5 propagate within the cylindrical regions into the pans of the plate 3 by successive reflections and then are scattered toward the outside of the plate parts when they are incident on a scattering center. The scattered rays thus emitted can emerge from the device. By a suitable choice of the disposition, density of scattering centers over the respective plate parts in question, and intensity and color of the light rays emitted by each of the LEDs 5, a fight flux capable of producing by itself one or the other or several of the "signaling" functions sought can be obtained at the output of the signaling light.

In the device according to the invention, the color of the light emitted by each of the LEDs, including the optional additional LEDs, and that of the plate forming the element can be appropriately chosen.

In the present context, the term "orthogonal" is aimed at the light emitted by the LEDs, the latter being positioned in such a manner as to scatter the light emitted over the whole length of the cylindrical bulge forming a guide, as illustrated by the drawing and indications appearing hereinabove.

By incorporating the device according to the invention into, for example, an automobile-vehicle rear-light assembly, the following may even be obtained therein; a color known as "acid green" (also referred to as "Quo acid" or "fluo green") suitable for distinguishing a "green" vehicle from a conventional vehicle or a "light blue" color (for example, crystal with 3-4% blue known as "police blue") suitable for indicating an electrically powered vehicle during the daytime whereas the prescribed colors associated with the "light" function are conserved at night.

The invention has been described above in an illustrative manner. It is to be understood that the terminology that has been used above is intended to be in the nature of words of description rather than of limitation. Many modifications and variations of the invention are possible in light of the above teachings. Therefore, within the scope of the appended claims, the invention may be practiced other than as specifically described above.

What is claimed is:

1. A device for a lighting/signaling assembly of an automotive vehicle, said assembly including a substantially transparent optical material and at least one light source of an "LED" type arranged for emitting light rays propagating within a thickness of the optical material, said device comprising:

a plate of substantially transparent optical material forming a screen and including at least one substantially bilateral elongated bulge defining a substantially circular overall substantially perpendicular cross-section and substantially mean longitudinal axis in a substantially mid-plane of said bulge and being adapted to form a light guide; and at least one LED disposed at one end at least of said light guide and defining a main axis of said LED that is substantially orthogonal to a substantially longitudinal axis of said light guide.

2. A device as set forth in claim 1, wherein said device forms either of a position lamp and light both at a rear and front of the vehicle.

3. A device as set forth in claim 1, wherein said plate is either of substantially plane and curved and said bulge forms an integral part of said plate.

4. A device as set forth in claim 1, wherein said light guide is any of substantially linear, curved in two dimensions, and curved at least once in all three dimensions.

5. A device as set forth in claim 1, wherein said plate includes at least one of at least one conventional inclusion and at least one irregularity and said bulge includes at least one prism with a pre-defined structure and angle.

6. A device as set forth in claim 1, wherein said plate defines a thickness of said plate of about 3 to about 4 mm and said bulge defines a diameter of said bulge of about 7 to about 10mm.

7. A device as set forth in claim 1, wherein said device comprises further at least one additional LED directed onto either of a free edge of said plate and at least one section of said plate defined by said light guide.

8. A device as set forth in claim 1, wherein said plate comprises further at least one of at least one decorative dot and at least one decorative line.

9. A lighting/signaling assembly of an automobile vehicle, wherein said assembly comprises:

a substantially transparent optical material;

at least one light source of an "LED" type arranged for emitting light rays propagating within a thickness of said optical material; and at least one device integrated into a headlamp including:

a plate of other substantially transparent optical material forming a screen and including at least one substantially bilateral elongated bulge defining a substantially circular overall substantially perpendicular cross-section and substantially mean longitudinal axis in a substantially mid-plane of said bulge and being adapted to form a light guide; and at least one LED disposed at one end at least of said light guide and defining a main axis of said LED that is substantially orthogonal to a substantially longitudinal axis of said light guide.

10. An assembly as set forth in claim 9, wherein said device forms either of a position lamp and light both at a rear and front of the vehicle.

11. An assembly as set forth in claim 9, wherein said plate is either of substantially plane and curved and said bulge forms an integral part of said plate.

12. An assembly as set forth in claim 9, wherein said light guide is any of substantially linear, curved in two dimensions, and curved at least once in all three dimensions.

13. An assembly as set forth in claim 9, wherein said plate includes at least one of at least one conventional inclusion and at least one irregularity and said bulge includes at least one prism with a pre-defined structure and angle.

14. An assembly as set forth in claim 9, wherein said plate defines a thickness of said plate of about 3 to about 4 mm and said bulge defines a diameter of said bulge of about 7 to about 10 mm.

15. An assembly as set forth in claim 9, wherein said device comprises further at least one additional LED directed onto either of a free edge of said plate and at least one section of said plate defined by said light guide.

16. An assembly as set forth in claim 9, wherein said plate comprises further at least one of at least one decorative dot and at least one decorative line.

* * * * *